Nov. 3, 1953 J. S. ATKINS 2,657,890
ANCHORING DEVICE FOR INSULATED FLEXIBLE ELECTRIC CABLES
Filed July 30, 1951
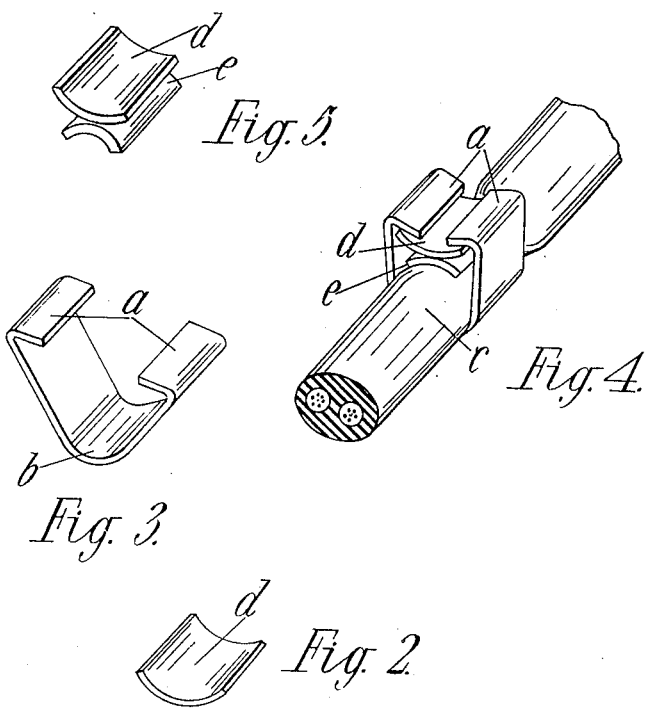
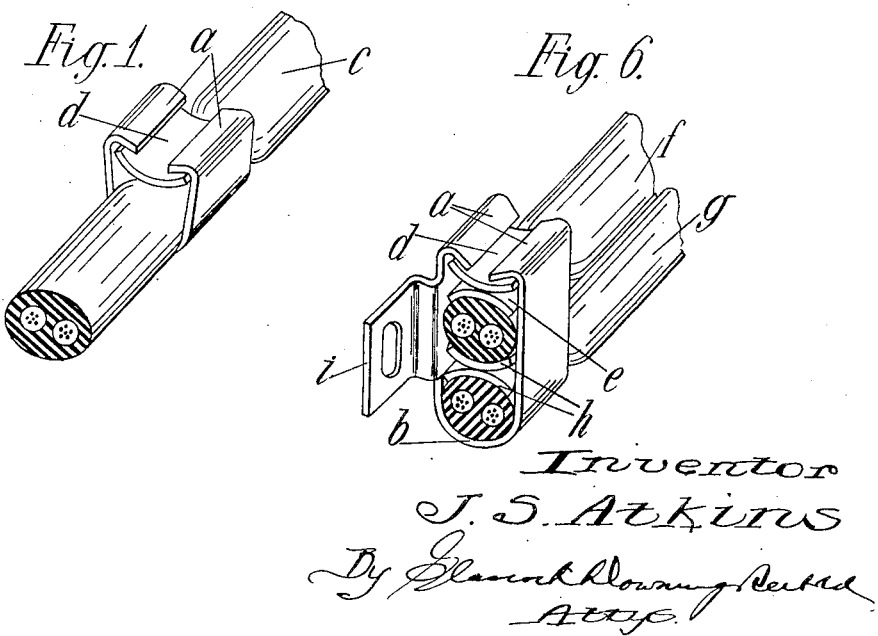
Inventor
J. S. Atkins Patented Nov. 3, 1953

2,657,890

UNITED STATES PATENT OFFICE 2,657,890

ANCHORING DEVICE FOR INSULATED FLEXIBLE ELECTRIC CABLES

John Stuart Atkins, Redditch, England, assignor to Alkaline Batteries Limited, Redditch, England, a British company Application July 30, 1951, Serial No. 239,255

Claims priority, application Great Britain August 10, 1950

6 Claims. (Cl. 248—74)

This invention relates to anchoring devices for insulated flexible electric cable, such as are used to anchor the end of a cable in a terminal housing so as to prevent the cable applying stresses to the terminals. Heretofore threaded components or serrated or corrugated parts have been applied to the cable in order to anchor it to a terminal housing but such prior arrangements have in many cases been harmful to the cable. Usually also the anchoring device when being removed from a cable is destroyed and cannot be re-used.

The object of my present invention is to provide an improved anchoring device which is very effective in service, does not damage the cable to which it is applied and which can if desired be re-used after removal from a cable.

A device in accordance with this invention comprises a strap-like part of a V or U form (hereinafter termed V for convenience of reference) with inturned hook-like ends, and a curved metal strip adapted to be placed with its convex side against the cable and with its ends under the inturned ends of the V member and to become curved to a greater extent so that its centre part presses into the cable insulation, when the arms of the V are bent closer together.

According to a further feature of the invention, the device has a guard strip curved to a radius approximating that of the cable, adapted to seat on the cable and support the curved metal strip.

With the parts assembled as before referred to, if the arms of the V are brought closer together by suitable pressure, the curved metal strip between the V ends will have its curvature increased, which will cause it to press at a midpoint firmly into the cable or to press the guard strip firmly onto and into the cable.

In this way the device is firmly anchored to the cable and when located in a suitable housing effectively prevents endwise and torsional movements of the cable being transmitted to the terminals to which the cable is electrically connected.

My improved anchoring device may be utilised to secure a number of parallel cables. In this case the V member is of sufficient depth to accommodate the parallel cables, with curved guard plates between the cables. The pressing of the ends of the V together will cause the curved metal strip which extends between the V ends to apply pressure directly or indirectly to the upper cable and so to the other cable or cables in the V.

The V member may have a lug formed thereon with screw or like holes therein by which the anchoring device can be secured to walls or other supports for house or industrial electric wiring.

If the V member is opened out to enable the plate between its ends to be removed and if such plate be bent back to its original form, the device can be re-used.

Referring to the accompanying explanatory drawing:

Figure 1 shows in perspective one form of the anchoring device in accordance with the invention in position on a cable.

Figures 2 and 3 show the two parts of the device of Figure 1 separately.

Figure 4 shows another form of the device in position on a cable.

Figure 5 shows separately a part of the device of Figure 4.

Figure 6 shows a third form of the device.

Referring to Figures 1–3, the anchoring device consists of a V-shaped strap-like part, Figure 3, with inturned hook-like ends $a$, the internal radius of the curved part $b$ at the apex of the V being approximately that of the cross-section of the cable $c$. A curved metal strip $d$ is placed with its convex side against the cable $c$ and with its ends under the inturned ends $a$. Then the arms of the V are bent closer together into the form shown in Figure 1, whereby the strip $d$ has its curvature increased, which causes its centre part to press firmly into the cable insulation so that the device is firmly anchored to the cable.

In the device shown in Figures 4 and 5, there is placed between the strip $d$ and the cable a guard strip $e$ of metal strip bent to a radius approximating that of the cable, with its concave side against the cable. The guard strip $e$ may if desired be connected to the strip $d$ by riveting, welding or otherwise.

In the device shown in Figure 6, the V-shaped member is made of greater depth so as to take two cables $f$ and $g$. There is a guard strip $e$ over the upper cable $f$, as in Figure 4, and further similar guard strips $h$ are placed between the two cables. The V member is formed with a lug $i$ having a screw hole whereby the anchoring device may be secured to a wall or other support.

What I claim is:

1. Anchoring means for insulated flexible electric cables including a first member comprising spaced legs and a bight portion connecting the same, inturned facing flanges on the ends of the legs, the legs being bendable toward one another and having a length in excess of the diameter of at least one cable to be anchored, the bight portion connecting the legs having an extent sufficient to accommodate a cable in a position between the legs and in contact with the bight portion, and a pressure applying member comprising a curved bendable sheet metal member having a length approximately that of the width of the legs and disposed between a cable to be anchored and the flanges with its convex side adjacent the cable and its opposite ends disposed beneath the flanges on the legs and engageable there beneath whereby bending of the legs toward one another bends the sheet metal member to increased curvature so that the central portion of the sheet metal member applies pressure on the cable in a direction transverse to the cable axis and transverse with respect to the movement of the legs toward one another.

2. Anchoring means as defined in and by claim 1 and further including a curved guard strip curved to a radius approximating that of the cable and disposed between the cable to be anchored and the curved sheet metal member with the concave side of the guard strip contacting the cable.

3. Anchoring means as defined in and by claim 2 and in which the sheet metal member and the guard strip are connected together along their convex sides.

4. Anchoring means as defined in and by claim 1 and in which the legs of the first member have a length sufficient to accommodate plural cables in superimposition with guard plates between the cables.

5. Anchoring means as defined in and by claim 1 and in which one of the legs has a lug projecting therefrom and said lug having a fastener receiving aperture therethrough to facilitate mounting of the anchoring means on a support.

6. Anchoring means for insulated flexible electric cables including a first member V-shaped in cross section and including spaced legs and a connecting radiused bight portion, inturned facing flanges on the ends of the legs, the legs being bendable toward one another and having a length in excess of the diameter of at least one cable to be anchored, the bight portion connecting the legs having an extent sufficient to accommodate a cable in a position between the legs and in contact with the bight portion and said latter portion having an internal radius at its apex approximating the radius of the cable, and a pressure applying member comprising a curved, bendable sheet metal member disposed between the cable and the flanges with its convex side adjacent the cable and its opposite ends disposed beneath the flanges and engageable by the portions of the legs adjacent the flanges whereby bending of the legs toward one another bends the sheet metal member to increased curvature so that the central portion thereof applies pressure on the cable in a direction transverse to the cable axis and transverse to the movement of the legs.

JOHN STUART ATKINS.

References Cited in the file of this patent

UNITED STATES PATENTS

| Number | Name | Date |
|---|---|---|
| 1,373,590 | Bodmer | Apr. 5, 1921 |
| 1,656,226 | Palm | Jan. 17, 1928 |
| 1,668,953 | Erickson | May 8, 1928 |

FOREIGN PATENTS

| Number | Country | Date |
|---|---|---|
| 4,501 | Netherlands | Oct. 11, 1919 |